United States Patent [19]
Pischinger

[11] 3,990,413
[45] Nov. 9, 1976

[54] FUEL INJECTION SYSTEM FOR SINGLE OR MULTIPLE CYLINDER INTERNAL COMBUSTION ENGINES

[76] Inventor: Franz Pischinger, 4, Im Erkfeld, 51 Aachen-Richterich, Germany

[22] Filed: Feb. 13, 1974

[21] Appl. No.: 442,298

[30] Foreign Application Priority Data
Feb. 28, 1973  Germany............................ 2309916

[52] U.S. Cl. ......................... 123/32 G; 123/32 ST; 123/139 BG; 417/494; 417/499
[51] Int. Cl.² ..................... F02M 45/02; F04B 7/04
[58] Field of Search........ 123/32 G, 139 BG, 140 T, 123/32 ST, 139 R; 417/494, 499

[56] References Cited
UNITED STATES PATENTS

| | | | |
|---|---|---|---|
| 1,993,759 | 3/1935 | Stockmeyer | 417/494 |
| 2,030,086 | 2/1936 | Woolson | 123/32 G |
| 2,173,813 | 9/1939 | Bischof | 123/32 G |
| 2,575,955 | 11/1951 | Hatch | 417/494 X |
| 2,858,822 | 11/1958 | Staege et al. | 123/139 BG |
| 3,392,715 | 7/1968 | Thoma | 123/32 G X |
| 3,435,811 | 4/1969 | Guertler | 123/139 R |
| 3,439,655 | 4/1969 | Eyzat | 123/32 G |
| 3,465,737 | 9/1969 | Dreisin | 123/139 R |
| 3,792,692 | 2/1974 | Kiley | 123/32 G |

FOREIGN PATENTS OR APPLICATIONS

| | | | |
|---|---|---|---|
| 610,095 | 10/1948 | United Kingdom | 123/32 G |
| 1,235,501 | 6/1971 | United Kingdom | 123/32 G |

*Primary Examiner*—Charles J. Myhre
*Assistant Examiner*—Tony M. Argenbright
*Attorney, Agent, or Firm*—Neil F. Markva

[57] ABSTRACT

A fuel injection system for single or multiple cylinder internal combustion engines comprises two fuel injection valves for each cylinder of an engine. One fuel injection valve operates to inject a principal volume of fuel and the other a secondary volume of fuel into said cylinder. The two injection valves are fed by a plunger which is reciprocable in the working chamber of a pump body. The working chamber of the pump body communicates with a fuel admission duct, a delivery duct for the delivery of a principal fuel volume to the one fuel injection valve and a delivery duct for the delivery of a secondary fuel volume to the other fuel injection valve in such a manner that the duct for the delivery of the principal fuel volume is covered by the plunger after the same has completed a predetermined part of its stroke.

18 Claims, 2 Drawing Figures

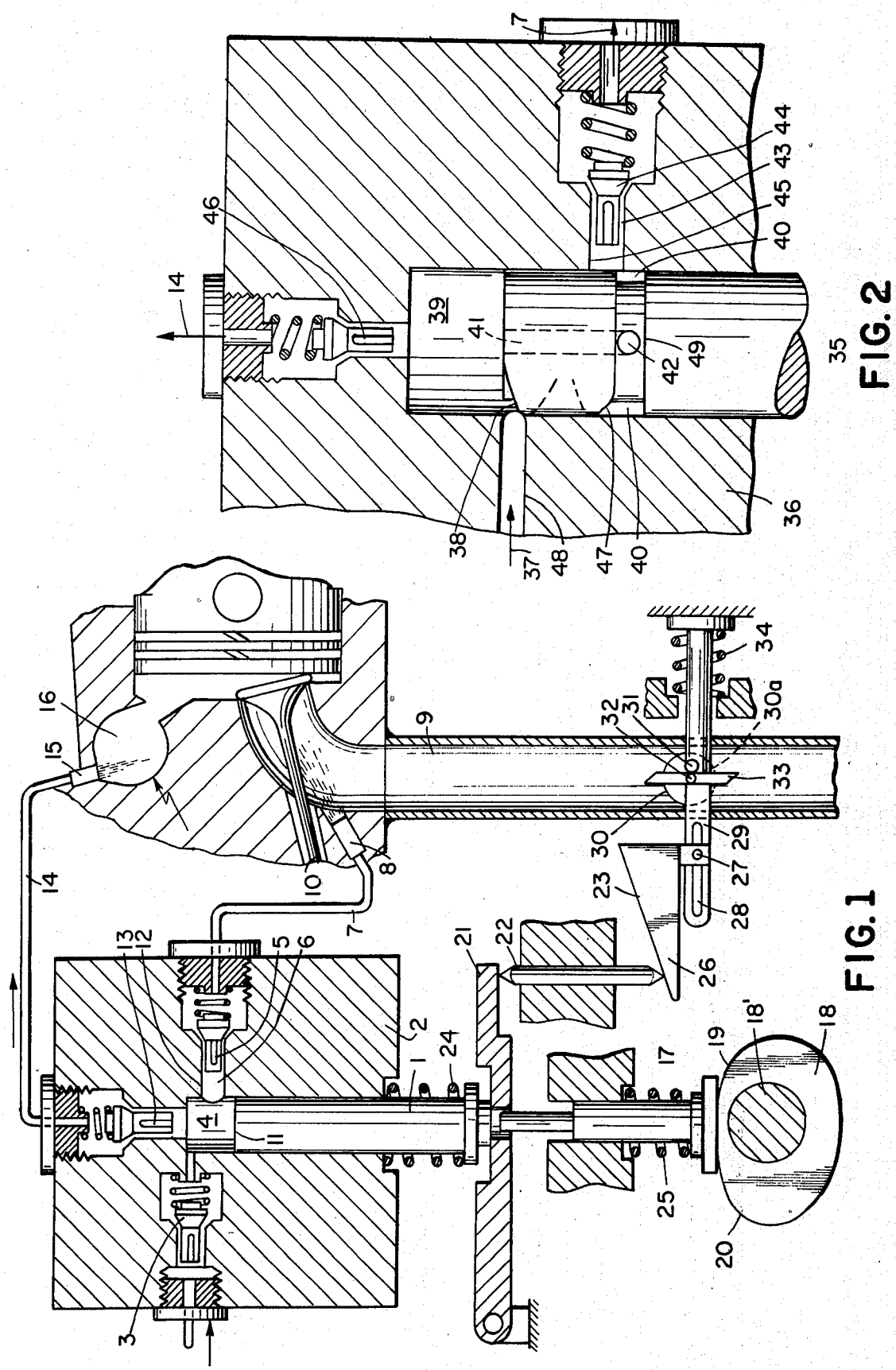

FUEL INJECTION SYSTEM FOR SINGLE OR MULTIPLE CYLINDER INTERNAL COMBUSTION ENGINES

BACKGROUND OF THE INVENTION

This invention relates to a fuel injection system for single or multiple cylinder internal combustion engines, comprising two fuel injection valves for each cylinder, of which one operates to inject a principal fuel volume, depending upon the engine load, into an induction manifold of an internal combustion engine upstream of an inlet valve, and the other is arranged to inject a secondary fuel volume directly into the combustion chamber in the neighborhood of a spark plug.

The point about internal combustion engines of the specified kind is their low emission of undesirable components in the exhaust gas.

More particularly, for compression ignition engines, systems have already been proposed in which two volumes of fuel are injected in timed succession during each working cycle, but in which — in contradistinction to the above-specified type — both volumes are injected into the combustion chamber by a single injection valve. The separation in time of the two injections can be achieved, as is well understood, by stopping the movement of the pump plunger during its delivery stroke and continuing the stroke at a later time, or by contriving the plunger to provide two completely separate fuel deliveries in the course of each working cycle of the internal combustion engine. However, difficulties of a mechanical nature are liable to arise as a result of the high delivery pressures which are required.

A different technique of timely separating the two injections has therefore been proposed, in which each working chamber of the pump is associated with one principal fuel delivery pipe to one of the working cylinders of the internal combustion engine, and a branch pipe delivers a secondary fuel volume to another working cylinder of the engine, throttling means in the branch pipe permitting the volumetric proportion of principal to secondary injection to be controlled. It is again a drawback that the principal and secondary volumes cannot be controlled independently the one from the other. Furthermore, flexibility of control in such injection systems is considerably restricted because the relative timing of principal and secondary injections is fixed by the number and firing order of the several working cylinders of the internal combustion engine.

Another known possibility of effecting sequential injections in a manner based on the last described principle consists in injecting the principal and the secondary fuel volumes into each cylinder through separate valves (German Patent Application No. 1 808 650). The secondary volume can be kept constant by a metering plunger in the supplementary fuel pipe. The defect of this arrangement is that the secondary volume which is delivered via the metering plunger cannot be injected except at pressures below that of the principal volume. This is contrary to the needs of an injection of the secondary volume directly into the combustion chamber, and calls for the use of undesirably high injection pressures for the principal volume. Moreover, with regard to the relative timing of principal and secondary injection the previously mentioned objections also apply. Furthermore, the provision of metering plungers is an added complication and increases cost, besides being an additional source of possible trouble.

Yet another drawback of the known arrangements is that during injection a branched system of pipes is pressurized, a circumstance liable to cause more trouble by the build-up of pressure oscillations.

From the point of view of operating reliability it is a drawback that a defect in one of the pumping elements involves two cylinders at the same time.

SUMMARY OF THE INVENTION

One object of the present invention is therefore the elimination of the described drawbacks and defects of the systems already known in the art.

Another object is the provision of a fuel injection system which is of simple design and construction.

Still another object is the provision of a fuel injection system which is based on the association of only one plunger of a fuel pump with each cylinder of an internal combustion engine.

According to the invention the fuel delivery pipes for the principal and the secondary fuel volumes are connected to the working chamber of the same pump plunger, the port in the pump cylinder associated with the principal fuel delivery pipe being so located that the plunger will cover this port after having completed a predetermined part of its stroke.

Preferably the injection pressure of the principal fuel volume is always less than the pressure at which the injection valve for the secondary volume will open.

During the delivery stroke of the pump plunger in an injection system according to the invention fuel is first delivered through the open port of the delivery duct for the principal fuel volume to the low pressure injection valve in the induction manifold of the internal combustion engine. The injection valve for the secondary fuel volume, which is set to open at a higher pressure remains closed during this stage. When the port of the delivery duct for the principal fuel volume is recovered by the plunger moving upwards the injection of the principal fuel volume is at an end. The continued stroke of the pump plunger now raises the fuel pressure in the working chamber of the pump body until it reaches the opening pressure of the injection valve for the secondary fuel volume and this is injected directly into the combustion chamber.

In the further development of the thought which underlies the invention quantitative control of the injected fuel volumes may be effected by varying the beginning of the working stroke of the pump plunger by reference to the engine load and/or the engine speed, in a manner that is well understood in the art. The final portion of the stroke of the pump plunger and hence the delivery volume of the secondary fuel at high pressure will thus remain constant.

Another possible way of controlling the volumes of principal and secondary fuel injection is to provide the plunger with obliquely cut control edges, as is also known in the art. In such a case the principal as well as the secondary fuel volumes can be controlled by making use of the obliquity of the control edges by rotating the plunger in a conventional manner about its axis according to the existing engine load or speed. The delivery of the secondary volume in this arrangement is terminated by a control edge of the plunger which uncovers a transfer port for relieving the pressure in the working chamber of the pump.

By suitably designing the contour of the cam edge operating the plunger the secondary volume can be injected into the combustion chamber of the internal combustion engine towards the end of the compression stroke, i.e. shortly prior to ignition, whereas the principal fuel volume is timed to be injected either whilst the inlet valve of the engine cylinder is open or closed. Owing to low injection pressure during the delivery of the principal fuel volume the design of the injection cam and of the other mechanical members is greatly facilitated and simplified when compared with a two-stage high pressure injection system.

One advantage of the present fuel injection system over hitherto known systems is its greater simplicity. Metering plungers and throttling restrictions in the delivery pipes for the secondary fuel are unnecessary. Moreover, the timing of the working cycles in the several cylinders of a multicylinder internal combustion engine is not a factor limiting the flexibility of control of the present system. In other words, the present system is independent of the number of cylinders and of their firing order. Moreover, the proposed arrangement permits the high pressure necessary for effective injection into the combustion chamber to be built up in a very simple way without creating the problems otherwise inherent in the necessity of injection into the induction manifold at high pressure. The principal fuel volume is injected into the induction manifold at a substantially lower pressure. Another advantage is that simple injection valves can be used in the induction manifold and in the combustion chamber.

More particularly, the arrangement of a fuel injection system according to the invention is suitable for the formation of a stratified mixture in the combustion chamber of a spark ignition engine. The principal fuel volume which is injected into the induction manifold forms a lean, nearly homogeneous foundation mixture which enters the cylinder during the suction stroke. The layered structure of the mixture is produced by the direct injection of the secondary fuel into the combustion chamber in proximity with the spark plug. The combustion chamber of such an internal combustion engine may be divided into principal combustion chamber and an antechamber in which secondary injection and ignition take place.

In an internal combustion engine of this kind it is a special advantage of the fuel injection system according to the invention that it affords complete freedom of choice with regard to the timing of the principal and secondary injection. It has been found that correct timing is of paramount importance for achieving optimum combustion in the engine both from the point of view of fuel economy and the suppression of undesirable constituents in the exhaust gas.

It has also been established that the intake air need not be throttled throughout the major part of the operating range of the engine. The performance of the engine is primarily controlled by the principal injection volume, whereas the secondary volume of fuel injection is important only at low partial loads. This greatly reduces the complexities of control and throttling losses are largely avoided. Merely in the range of very low loads and when idling has a reduction in the volume of intake air by throttling proved desirable. The nature of the exhaust gas can thereby be further improved.

According to yet another feature of the invention it is therefore proposed to couple the control means of the fuel pump to a throttle in the induction manifold in such a way that in the range of small injection volumes the throttle will be progressively closed as the injected volumes become smaller.

BRIEF DESCRIPTION OF THE DRAWING

Two embodiments of the invention will now be described by way of example and with reference to the accompanying drawing, in which:

FIG. 1 is a cross section of a first embodiment of a fuel injection system according to the invention and FIG. 2 is a cross section of a second embodiment in which the fuel volumes for principal and secondary injection are controlled by oblique control edges on a pump plunger.

DESCRIPTION OF THE PREFERRED EMBODIMENTS

Referring first to FIG. 1 this illustrates an embodiment of the invention in simplified form with the omission of details not directly relevant to the invention. By the upward motion of a reciprocable pump plunger 1 in a bore in the body 2 of a pump the fuel which has previously been drawn into the working chamber 4 of the pump through an admission valve 3 is compressed. The rising pressure of the fuel causes an outlet valve 5 in a low pressure delivery duct 6 for the delivery of the principal fuel volume to open. The fuel flows through a low pressure pipe 7 and an injection valve 8, which opens when the pressure is still low, into an induction manifold 9 on the upstream side of the inlet valve 10 of an internal combustion engine. When the upper leading edge 11 of the pump plunger 1 crosses the upper edge 12 of the inlet port of the low pressure delivery duct 6 for the principal fuel volume, the further supply of fuel into the low pressure delivery duct 6 ceases. Continued upward movement of the pump plunger 1 further raises the pressure of the fuel in the working chamber 4 of the pump until finally a secondary injection valve 15 opens and allows a secondary fuel volume to pass through a pressure valve 13 and a high pressure fuel pipe 14 for direct injection into an antechamber 16 of the combustion chamber of the internal combustion engine. The pump plunger 1 is operated by a tappet 17 riding on cams 19 and 20 of a cam disc 18 fixed to a camshaft 18¹. By suitably designing the two cams 19 and 20 of the cam disc 18 the timing of the injection of the principal and secondary fuel volumes can be fixed. A circularly arcuate portion of the cam disc surface about the camshaft axis keeps the pump plunger 1 stationary when the injection of the principal fuel volume has been completed and until the working cycle of the internal combustion engine has sufficiently advanced for the injection of the secondary fuel volume to begin at the required instant of time. Whereas the secondary fuel volume remains constant as a result of the predetermined remaining length of the plunger stroke after the inlet port of the low pressure delivery duct 6 has been covered, the principal fuel volume can be readily varied by a change in position of a pin 22 which controls the angle of tilt of a stop arm 21. In other words, as is evident from the disclosure and the prior art knowledge, the principal or main injection fuel volume is load-variable and the secondary fuel injection volume is load-independent in the invention disclosed herein. The pin 22 can be raised and lowered by the cam 23 of a control member 26. Coil springs 24 and 26 urge the pump plunger 1 into its starting position and keep the tappet 17 in contact with its cam disc 18. The control member 26 is slidably movable according to the engine load. For this purpose the control member 26 carries a stud 27 which slidably engages a first slot 28 in a bar 29. This bar is provided with a second slot 30a engaged by an eccentric 30 mounted on an eccentric shaft 31 coaxially associated with a pivot pin 32 of a throttle 33 of the engine. In the lower partial-load range the control member 26 will be displaced to the left in the drawing, where its stud 27 will be at the left hand end of the first slot 28. Any further displacement of the control member 26 to the left will result in the stud 27 entraining the bar 29 in the same direction and thus tilting the trottle 33 by rotation of the throttle pivot pin 32 by the displacement of the eccentric 30 and its eccentric shaft 31. Consequently the intake air can be throttled down progressively in the region from partial loads to idling speed. As soon as the control member 26 is returned to the right a spring 34 operates to reopen the throttle 33.

FIG. 2 illustrates a modified form of construction in which control of the fuel volumes of the principal and the secondary injection is by obliquely cut control edges on a plunger 35. Let it be assumed in FIG. 2 that the plunger 35 is in course of moving upwards inside a pump body 36. The injection of the principal fuel volume commences when the course of the upward movement of the plunger an oblique control edge 38 on the plunger 35 has covered the port of a low pressure fuel admission duct 37 and the pressure of the fuel in a first working chamber 39 of the pump begins to rise. The working chamber 39 communicates with a second working chamber 40 of the pump through an axial duct 41 and a transverse duct 42 in the plunger 35 itself. Since the pressures in both working chambers must therefore always be equal, delivery of the principal fuel volume will begin through a low presssure duct 43 and a delivery valve 44 into the low pressure pipe 7 leading to the injection valve 8 in the induction manifold 9 (FIG. 1). The injection of the principal fuel volume ends when the control edge 49 of the plunger 35 reaches the upper edge 45 of the inlet port of the low pressure duct 43. The continued ascent of the plunger 35 now increases the pressure inside the two working chambers 39 and 40 of the pump until the injection valve 16 (FIG. 1) for the injection of the secondary fuel volume opens and this volume of fuel can be delivered through a high pressure valve 46 and the high pressure fuel pipe 14. The injection of the secondary fuel volume ends when an oblique edge 47 on the plunger begins to uncover the bottom edge 48 of the delivery port of the fuel admission duct 37 which now serves as an exhaust, because at this instant the pressure in the working chambers 39 and 40 of the pump will suddenly collapse and cause the high pressure valve 46 to reclose. By rotating the plunger 35 about its longitudinal axis the change in the operative position of the oblique control edge 38 permits the principal volume of fuel injection, and the change in position of the oblique edge 47 the secondary volume of fuel injection to be varied according to the load. The plunger can be rotated by conventional means which are not shown in FIG. 2. By means of a suitable mechanism functionally analogous to that described with reference to FIG. 1 the volume of intake air is reduced in the lower partial-load range down to idling speed by the operation of a throttle. This control could also be accomplished by electric, electronic or like means.

The invention may be embodied in other specific forms without departing from the spirit or essential characteristics thereof. The embodiments are therefore to be considered in all respects as illustrative and not restrictive.

What is claimed is:

1. A fuel injection assembly for single or multiple cylinder internal combustion engines having a combustion chamber within each cylinder and a throttle induction manifold, said assembly comprising:
   a. a pump body including a working chamber having an inlet opening and two outlet openings,
   b. a plunger means mounted to reciprocate along a working stroke path within said chamber,
   c. a first valve means for injecting a main quantity of fuel to a first location in an engine cylinder through a first of said outlet openings at a first injection pressure, and
   d. a second valve means for injecting a secondary quantity of fuel to a second location in said engine cylinder through the other said outlet opening at a second injection pressure,
   e. said first outlet opening being disposed at a location along said working stroke path and said second outlet opening being disposed at a location to deliver fuel from the clearance volume ullage of the chamber,
   f. said first valve means being responsive to a lower pressure within said chamber than said second valve means so that the injection pressure of the main quantity is always less than the injection pressure of said secondary quantity.

2. An assembly as defined in claim 1 wherein said plunger means is effective to block off said first outlet opening for a period of time before said second valve means injects said secondary quantity of fuel.

3. An assembly as defined in claim 1 wherein said plunger means is adjustably responsive to the engine load and engine speed for changing the beginning of said working stroke path.

4. An assembly as defined in claim 1 wherein said plunger means is adjustably responsive to the engine load for changing the beginning of said working stroke path.

5. An assembly as defined in claim 1 wherein said plunger means is adjustably responsive to the engine speed for changing the beginning of said working stroke path.

6. An assembly as defined in claim 1 wherein said plunger means includes a piston member having oblique control edges and being mounted to rotate about its longitudinal axis,
   said oblique control edges being effective to open and close said inlet opening to start and stop fuel delivery within said chamber.

7. An assembly as defined in claim 1 wherein a mechanical coupling is disposed between a means for controlling the volume of fuel injection and a throttle induction manifold of the internal combustion engine,
   said mechanical coupling being effective to provide a progressive closure of said throttle in response to the decrease in volume of injected fuel.

8. An assembly as defined in claim 1 wherein said plunger means includes a piston that is effective to permanently cover the first outlet means when the combustion engine is at low partial loads and at idling speed to completely suppress the injection of the main quantity of fuel to said engine cylinder.

9. An assembly as defined in claim 1 wherein said second valve means is effective to inject the secondary quantity of fuel directly into the combustion chamber of said engine cylinder.

10. A fuel injection assembly for single or multiple cylinder internal combustion engines having a combustion chamber within each cylinder and a throttle induction manifold, said assembly comprising:
 a. a pump body including a working chamber having an inlet opening and two outlet openings,
 b. a plunger means mounted to reciprocate along a working stroke path within said chamber,
 c. a first valve means for injecting a load-variable main injection volume of fuel to an engine cylinder through a first of said outlet openings at a first injection pressure,
 d. a second valve means for injecting a load-independent secondary injection volume of fuel to said engine cylinder through the other said outlet opening at a second injection pressure,
 e. said first outlet opening being disposed at a first location along said working stroke path and said second outlet opening being disposed at a second location along said working stroke path,
 f. said first valve means being responsive to a lower pressure within said chamber than said second valve means so that the injection pressure of the main quantity is always less than the injection pressure of said secondary quantity.

11. An assembly as defined in claim 10 wherein said second location being disposed for effecting delivery of fuel through said second valve means through the clearance ullage of the chamber.

12. An assembly as defined in claim 10 wherein said plunger means is effective to block off said first outlet opening for a period of time before said second valve means injects said secondary quantity of fuel.

13. An assembly as defined in claim 10 wherein said plunger means is adjustably responsive to the engine load and engine speed for changing the beginning of said working stroke path.

14. An assembly as defined in claim 10 wherein said plunger means is adjustably responsive to the engine load for changing the beginning of said working stroke path.

15. An assembly as defined in claim 10 wherein said plunger means is adjustably responsive to the engine speed for changing the beginning of said working stroke path.

16. An assembly as defined in claim 10 wherein said plunger means includes a piston member having oblique control edges and being mounted to rotate about its longitudinal axis,
said oblique control edges being effective to open and close said inlet opening to start and stop fuel delivery within said chamber.

17. An assembly as defined in claim 10 wherein a mechanical coupling is disposed between a means for controlling the volume of fuel injection and a throttle induction manifold of the internal combustion engine,
said mechanical coupling being effective to provide a progressive closure of said throttle in response to the decrease in volume of injected fuel.

18. An assembly as defined in claim 10 wherein said plunger means includes a piston that is effective to permanently cover the first outlet means when the combustion engine is at low partial loads and at idling speed to completely suppress the injection of the main quantity of fuel to said engine cylinder.

* * * * *